(12) United States Patent
Grundvig et al.

(10) Patent No.: US 7,242,696 B2
(45) Date of Patent: Jul. 10, 2007

(54) DIGITAL TDMA LINK WITH NO SYNC WORD

(75) Inventors: Jeffrey Paul Grundvig, Loveland, CO (US); Yun Xiang Yuan, Emmaus, PA (US)

(73) Assignee: Agere Systems Inc., Allentown, PA (US)

( * ) Notice: Subject to any disclaimer, the term of this patent is extended or adjusted under 35 U.S.C. 154(b) by 808 days.

(21) Appl. No.: 09/817,054

(22) Filed: Mar. 27, 2001

(65) Prior Publication Data

US 2002/0141434 A1   Oct. 3, 2002

(51) Int. Cl.
*H04J 3/06* (2006.01)
(52) U.S. Cl. .................................. 370/510; 370/350
(58) Field of Classification Search ............... 370/503, 370/509, 500, 512, 513, 514, 510, 350, 511
See application file for complete search history.

(56) References Cited

U.S. PATENT DOCUMENTS

| | | | | | |
|---|---|---|---|---|---|
| 3,724,139 | A | * | 4/1973 | Leverenz | 451/141 |
| 4,316,284 | A | * | 2/1982 | Howson | 370/512 |
| 5,235,598 | A | * | 8/1993 | Sasuta | 370/327 |
| 5,282,226 | A | * | 1/1994 | Critchlow | 375/295 |
| 5,325,405 | A | * | 6/1994 | Marko et al. | 375/366 |
| 5,566,210 | A | * | 10/1996 | Saito et al. | 375/329 |
| 5,886,999 | A | * | 3/1999 | Kojima et al. | 714/708 |
| 5,920,547 | A | * | 7/1999 | Werth | 370/280 |
| 5,960,046 | A | * | 9/1999 | Morris et al. | 375/347 |
| 6,111,927 | A | * | 8/2000 | Sokoler | 375/365 |

\* cited by examiner

*Primary Examiner*—Ajit Patel (57) ABSTRACT

The portion of TDMA frames otherwise containing the sync word is eliminated for one or more data frames at the end of a TDMA data burst to provided added bandwidth for data payload or for a reduced bandwidth. Once a communication channel has been established and is in steady state mode (after receipt of one or more frames), the sync word is eliminated from the remaining frame structure. Drift of a local clock with respect to an incoming data stream is monitored using an oversampled or multiplied master clock to provide suitable resolution to determine an approximate position of an active edge of the master clock with respect to a bit or symbol being clocked. Any drift from center results in an adjustment of the local master clock. In a preferred embodiment, the drift is measured in a last bit or symbol of a received TDMA burst, and the master clock is adjusted to re-center the local master clock with respect to that last bit. Accordingly, the receiver is 'tuned' to the clock signal of the transmitting TDMA device such that the receiving TDMA device can predict where the next start of frame will occur. By doing so, the sync word is no longer necessary in the remaining frames of the TDMA burst to decode the start of next TDMA frame. The sync word may be included in more than one frames in the beginning of the TDMA burst, but is eliminated from one or more frames at the end of the TDMA burst.

14 Claims, 9 Drawing Sheets

TDMA BURST

FIG. 5B
PRIOR ART

DATA FRAME

DIGITAL TDMA LINK WITH NO SYNC WORD

BACKGROUND OF THE INVENTION

1. Field of the Invention

The present invention relates to digital communications. More particularly, it relates to techniques and apparatus for increasing the reliability of recovered timing and frame boundaries and for simultaneously increasing bandwidth of a transmitted time division multiple access (TDMA) signal.

2. Background of Related Art

Digital communications take many forms and utilize many protocols. A very popular form of digital communications is called time division multiple access (TDMA).

TDMA, while being equally applicable to wired communications, is also a technology commonly used for delivering digital wireless service using time division multiplexing (TDM).

In a typical wireless application, TDMA works by dividing a radio frequency into time slots and then allocating the various time slots to multiple communication fields. In this way, a single frequency can support multiple, simultaneous data fields. TDMA is used, e.g., by GSM digital cellular systems.

Figure 4:
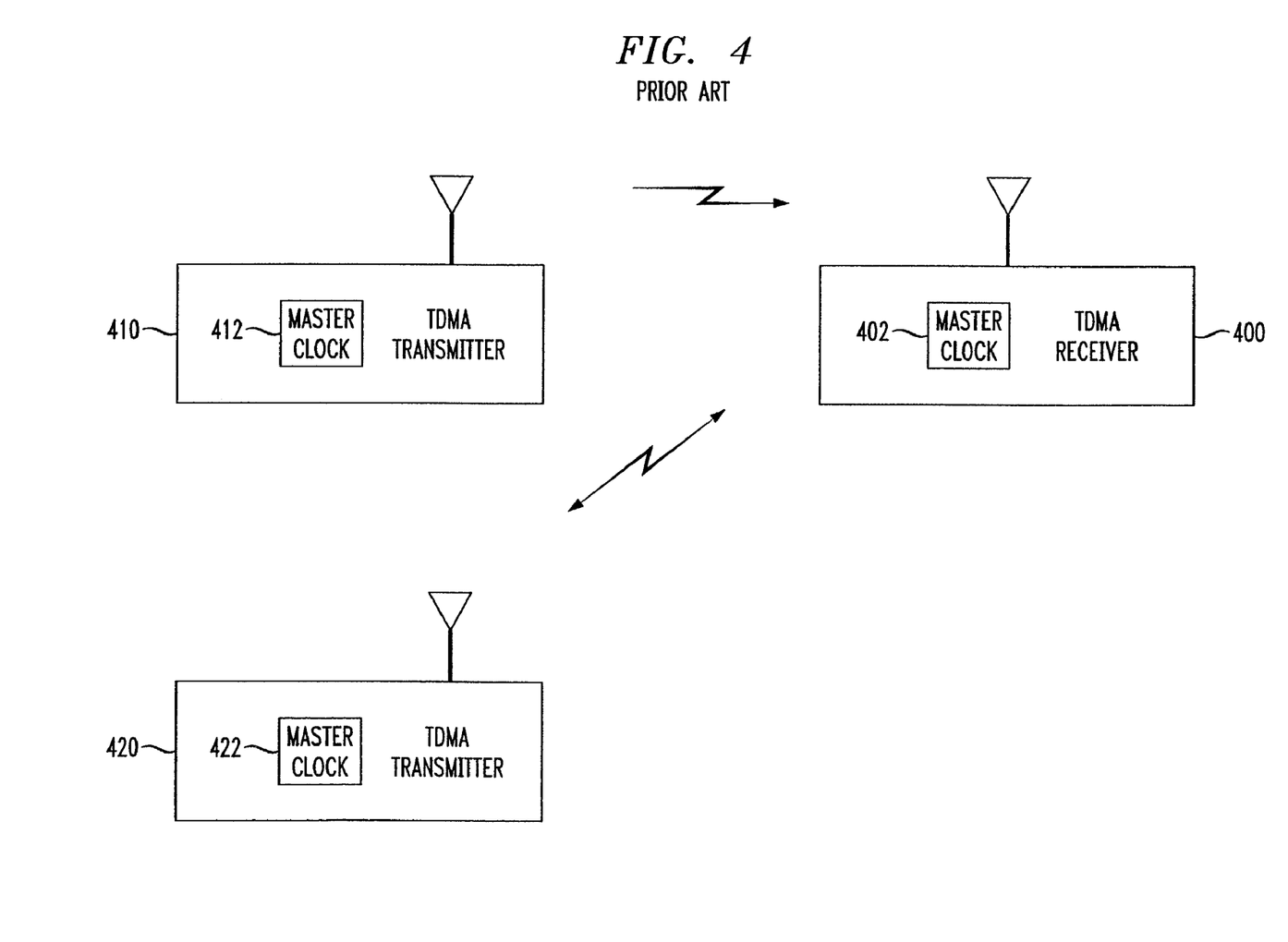
FIG. 4 shows a plurality of transmitter devices communicating with a receiver device using TDMA frames.

FIG. 4 shows a plurality of transmitter devices communicating with a receiver device using TDMA frames.

In particular, as shown in FIG. 4, a plurality of TDMA transmitter devices 410–420 may utilize separate time slots of a TDMA communication field to communicate with a TDMA receiver device 400. While shown as a unidirectional field in FIG. 4, any or all TDMA devices 400–420 may be transceivers.

The TDMA devices 400, 410, 420 all include their own independent master clock 402, 412, 422, respectively, at opposite ends of the communication field. While locally wired TDMA systems typically allow the use of a common master clock routed to each TDMA device, wireless or remote TDMA devices are not afforded the same luxury, and thus require coordination of the timing as between communicating devices. For instance, it is a common practice to recover a data clocking signal from a received TDMA signal so as to allow appropriate detection of the data in the frame.

Figure 5A:
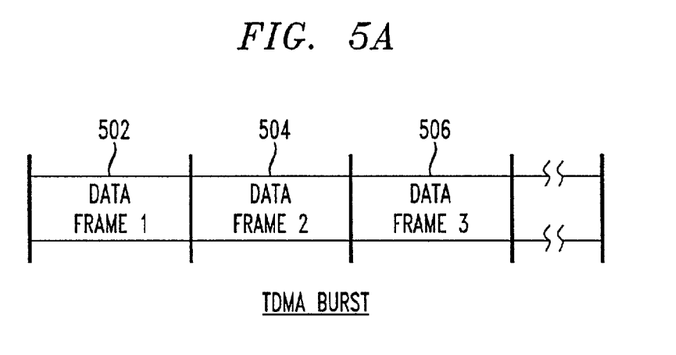
FIG. 5A shows multiple data frames within a single TDMA burst.
Figure 5B:
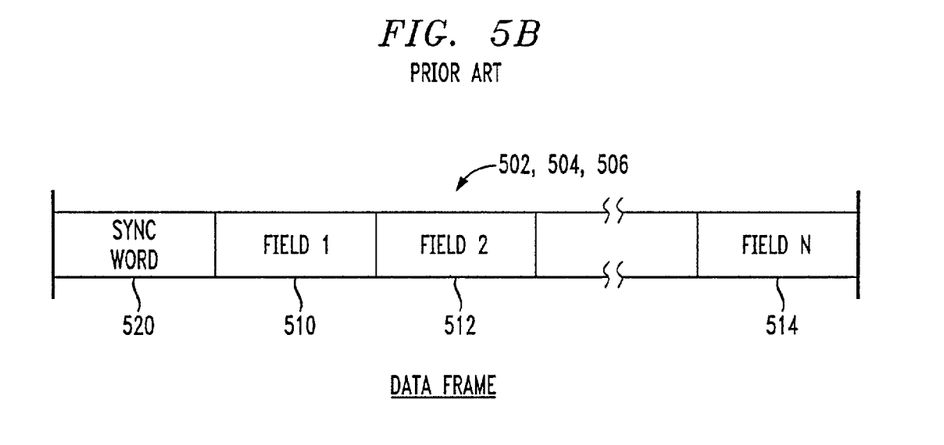
FIG. 5B shows a single data frame in more detail.

FIG. 5A shows multiple data frames within a single TDMA burst, and FIG. 5B shows a single data frame in more detail.

In particular, as shown in FIG. 5A, a TDMA burst between TDMA transmitters 410 and the TDMA receiver 400 typically includes a plurality of data frames 502–506. The length of each data frame and the number of data frames in a TDMA burst each depend upon the particular application.

FIG. 5B shows that the data frame 502 includes a plurality of fields 510–514. Anywhere between many fields and only one field may be implemented within a TDMA data frame, depending upon the particular application.

As shown in FIG. 5B, TDMA communications typically use a frame structure which includes a "sync word" 520 at the beginning of each frame 502, 504, 506. The TDMA receiver 400 recognizes and uses the sync word 520 to determine the "start of frame" for each data frame 502–506, so as to not lose any data bits from the communication.

Figure 6:
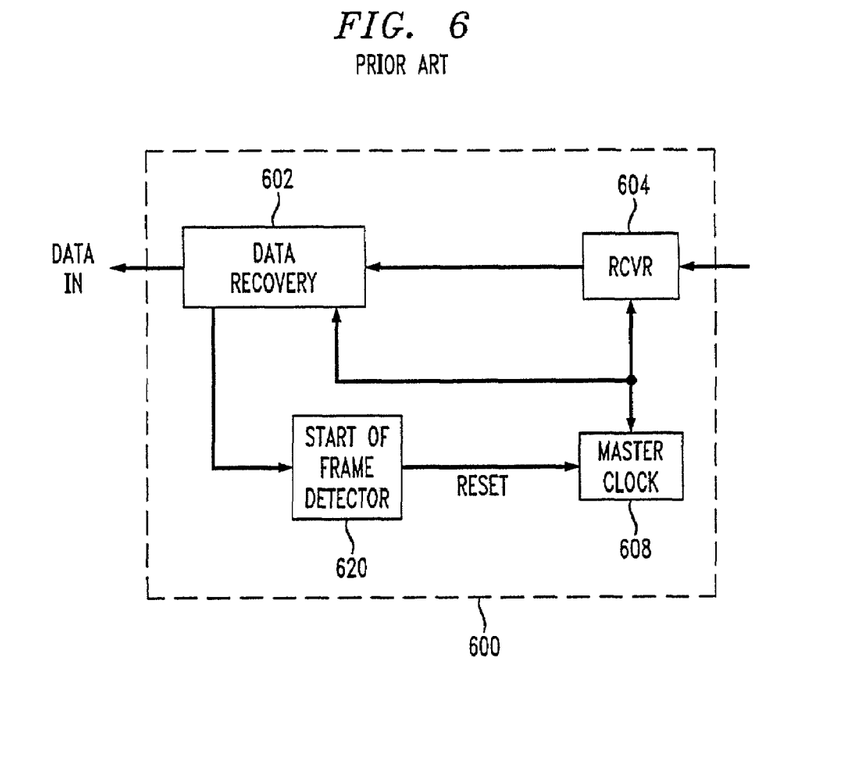
FIG. 6 shows a conventional technique for recovering a data clock from a received TDMA signal.

FIG. 6 shows a conventional technique for clocking a received TDMA signal with a local master clock.

In particular, as shown in FIG. 6, the receiver front end 600 typically includes a receiver (e.g., an RF receiver) 604 operated by a master local clock 608. The received data is clocked by a data clock signal generated by the master clock 608, and the received data is monitored by a start of frame detector 620 to determine the positioning of the start bit or symbol of each new frame in a TDMA burst.

In such a conventional system, the master clock 608 must be reset or otherwise synchronized with the start of a new data frame to ensure proper clocking of received data bits and adequate tolerance allowed for jitter, etc. Furthermore, because master transmit and receive clocks typically will drift with respect to one another, the position of the first bit in the TDMA frame will occasionally move relative to the receive master clock. Thus, a sync word is conventionally used to locate the start of each data frame in a TDMA burst to ensure proper clocking of the received data clock. While the sync word provides a suitable marking for the beginning of each frame in a TDMA burst, it also requires a number of bits or symbols, and takes up valuable bandwidth. Bandwidth is a valuable commodity, and is preferably conserved whenever possible, particularly in wireless applications.

Figure 7:
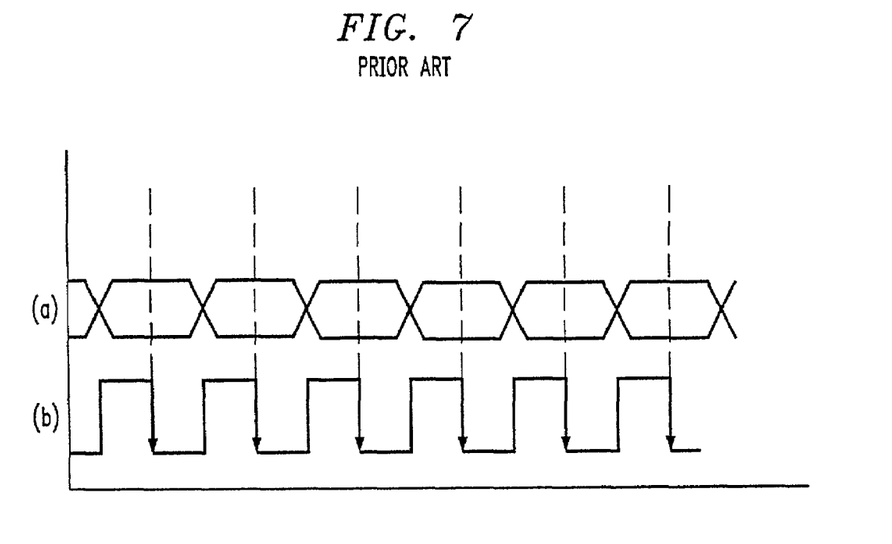
FIG. 7 shows the preferred positioning of an active edge of the recovered data clock (waveform (b)) with respect to the positioning of the recovered data (waveform(a)).

FIG. 7 shows the preferred positioning of an active edge of the recovered data clock (waveform (b)) with respect to the positioning of the recovered data (waveform(a)). Ideally, the active edge (e.g., the negative edge of the clock signal shown in FIG. 7) is centered on a respective bit or symbol of the received data stream in order to maximize the probability of correctly detecting received data.

As can be seen in FIG. 7, if the active edge (e.g., the negative edge) of the clock signal drifts too closely to the edges of the respective data bits, jitter or other anomalies may cause a data error, increasing the bit error rate.

SUMMARY OF THE INVENTION

In accordance with the principles of the present invention, a single TDMA data burst comprises a plurality of TDMA data frames. Less than all of the plurality of TDMA data frames include a sync word at a beginning of each of the TDMA data frames. The remaining ones of the plurality of TDMA data frames do not include a sync word.

In accordance with another aspect of the present invention, apparatus for receiving a TDMA burst comprises a receiver to receive a TDMA burst containing a plurality of frames, less than all of the frames including a sync word. Also included is a master clock, and a data clock transition position determiner to determine a position of an active edge of the master clock with respect to received data. The data clock transition position determiner adjusts a frequency of the master clock to maintain a centering of the active edge of the master clock within a respective portion of the received data.

A method of receiving TDMA burst data in accordance with yet another aspect of the present invention comprises receiving a TDMA burst containing a plurality of frames. A sync word is decoded in less than all frames of the TDMA burst. A centering of an active edge of a master clock is controlled with respect to at least one symbol in at least one of the plurality of frames.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention allows for the elimination or reuse of the portion of TDMA frames otherwise containing the sync word, or even elimination of the bandwidth required to support the increased length of the data frame due to existence of the sync word.

In accordance with the principles of the present invention, once a communication field has been established and is in steady state mode (after receipt of one or more frames), the sync word is eliminated from the remaining frame structure. Drift of a local clock with respect to an incoming data stream is monitored using an oversampled or multiplied master clock to provide suitable resolution to determine an approximate position of an active edge of the master clock with respect to a bit or symbol being clocked. Any drift from center results in an adjustment of the local master clock. In a preferred embodiment, the drift is measured during a received TDMA burst, and the master clock is adjusted to re-center the local master clock with respect to that last bit so that the transmit and receive master clocks are nearly identical in frequency and phase at the end of the TDMA frame.

Accordingly, the receiver is 'tuned' to the clock signal of the transmitting TDMA device such that the receiving TDMA device can predict where the next start of frame will occur. By doing so, the sync word is no longer necessary in the remaining frames of the TDMA burst to decode the start of next TDMA frame.

In accordance with the principles of the present invention, the sync word may be included in one or more frames in the beginning of the TDMA transmission, but is eliminated from one or more frames during the remainder of the TDMA transmission.

Figure 1:
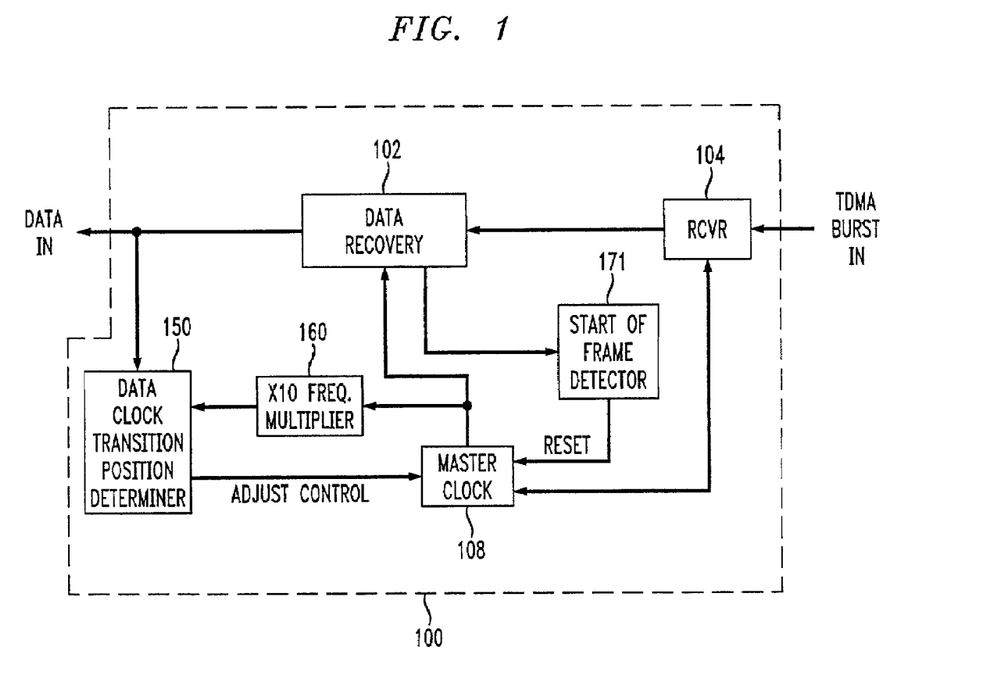
FIG. 1 shows a front end of a receiver including monitoring of a position of the active transition of a master clock with respect to the positioning of the received data, and control of the master clock, in accordance with the principles of the present invention.

FIG. 1 shows a front end of a receiver including monitoring of a position of the active transition of a master clock with respect to the positioning of the received data, and control of the master clock, in accordance with the principles of the present invention.

In particular, as shown in FIG. 1, a TDMA receiver front end 100 includes an appropriate receiver 104 (e.g., RF, BLUETOOTH™, etc.), clocked by a master clock 108. The received TDMA data burst is output to a data recovery module 102, which is clocked by a data clock signal recovered in an appropriate manner.

Importantly, the TDMA receiver front end 100 further includes a data clock transition position determiner 150 which determines the position of the clock transition (e.g., negative edge) with respect to the data bit or symbol which it is clocking. The data clock transition position determiner 150 determines whether or not the active edge of the output of the master clock 108 is centered on the recovered data. Any variation from center causes an adjust control signal to the master clock 108 in a feedback control technique.

The adjust control signal may be digital or analog. Moreover, the adjust control signal may represent, e.g., a voltage level to control a voltage controlled oscillator (VCO) or other clock source in the master clock 108.

To provide appropriate resolution to the data clock transition position determiner 150, an oversampled clock or subdivided symbol period clock signal is provided. In the disclosed embodiment, 10% resolution is provided using a times ten (×10) frequency multiplier 160.

Figure 1A:
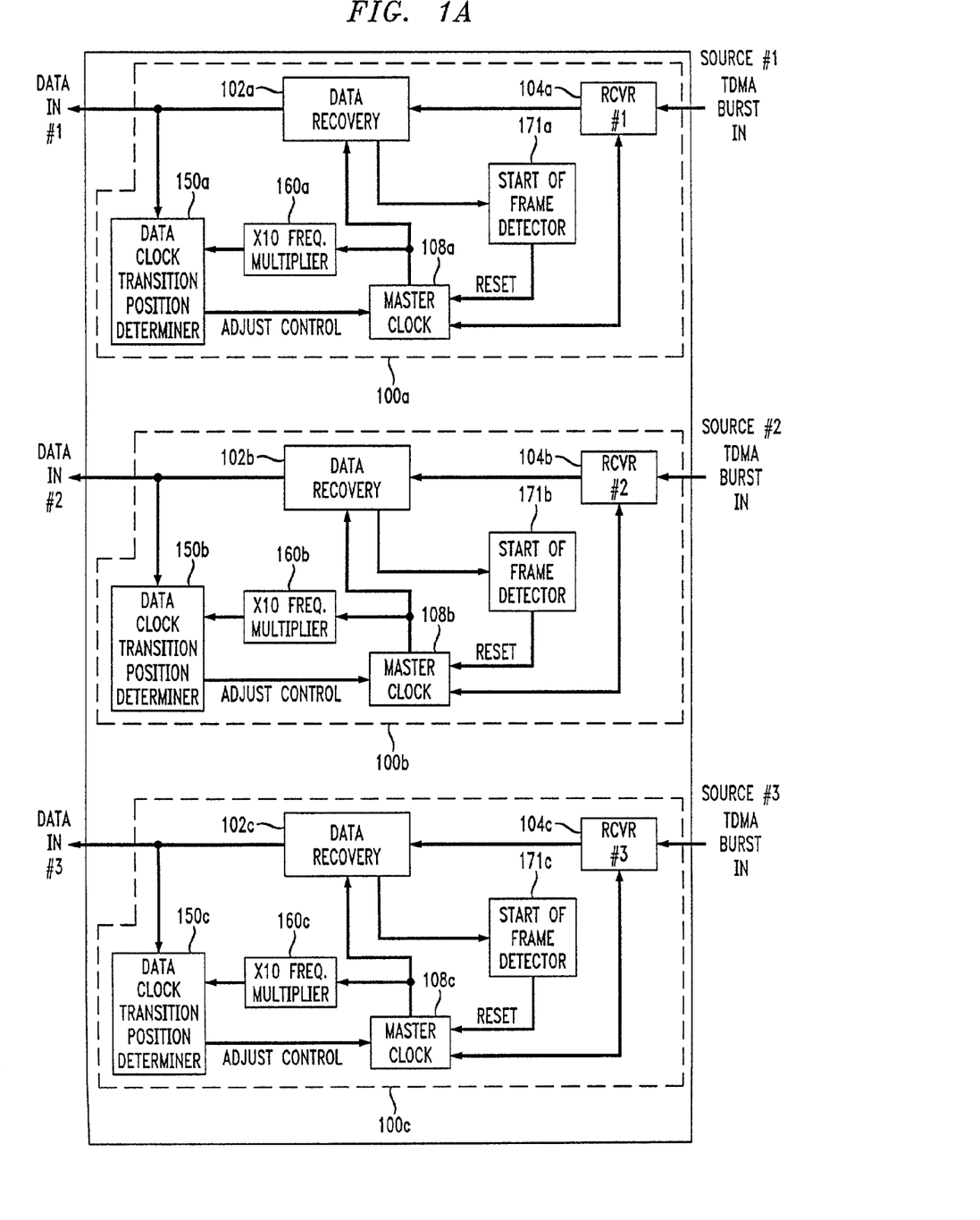
FIG. 1A shows a front end of a receiver including monitoring of multiple received streams from multiple transmitters, wherein the position of the active transition of a corresponding master clock is adjusted with respect to the positioning of each stream of received data, in accordance with the principles of the present invention.

FIG. 1A shows a front end of a receiver including monitoring of multiple received streams from multiple transmitters, wherein the position of the active transition of a corresponding master clock is adjusted with respect to the positioning of each stream of received data, in accordance with the principles of the present invention.

In particular, as shown in FIG. 1A, a separate receive oscillator/master clock may be implemented for each received TDMA data stream received from different transmitters. A corresponding master clock is assigned to a particular received TDMA data stream from a particular transmitter. All received TDMA data streams are assigned to individual master clocks.

Once assigned, the corresponding master clock for that particular TDMA data stream from that particular transmitter is adjusted, and monitored, otherwise in accordance with the principles of the present invention shown and described with respect to FIG. 1.

Figure 1B:
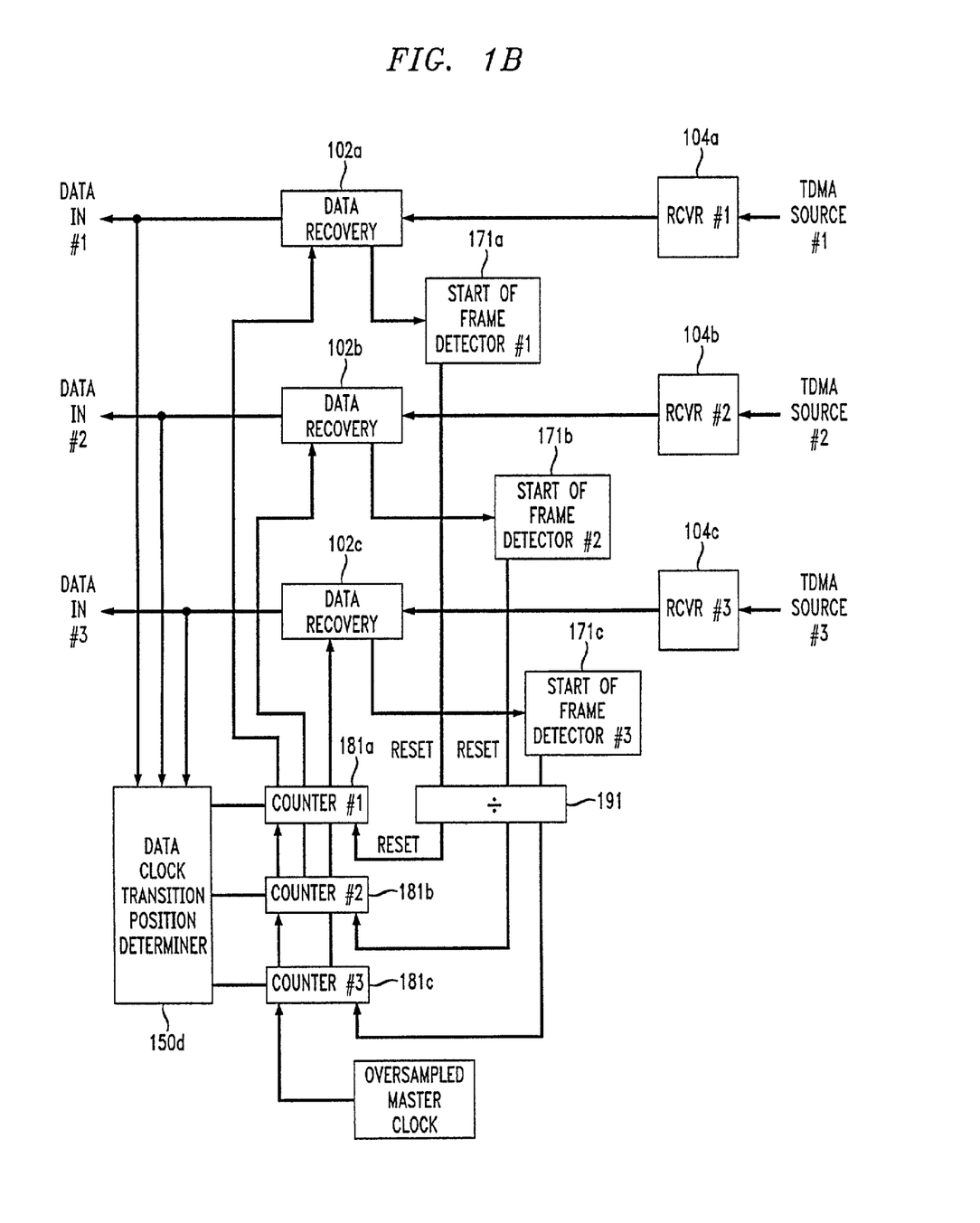
FIG. 1B shows an alternative implementation of the embodiment shown in FIG. 1A wherein a single highly over-sampled oscillator includes a digital division scheme to individually control the division of a single master clock with respect to each of a plurality of received data streams, in accordance with the principles of the present invention.

FIG. 1B shows an alternative implementation of the embodiment shown in FIG. 1A wherein a single highly over-sampled oscillator includes a digital division scheme to individually control the division of a single master clock with respect to each of a plurality of received data streams, in accordance with the principles of the present invention.

As shown in FIG. 1B, a single highly oversampled master clock is used to produce a desirable clock signal to respective data recovery circuits 102a–102c, after appropriate adjustment by a digital divider 191. The digital divider 191 suitably divides the highly oversampled master clock to arrive at a desired frequency and phase for the corresponding data recovery circuit 102a–102c. The division performed by the digital divider 191 is occasionally, periodically, or otherwise checked for accuracy and precision from time to time, and appropriately adjusted for each received TDMA data signal from different transmitters.

Figure 2:
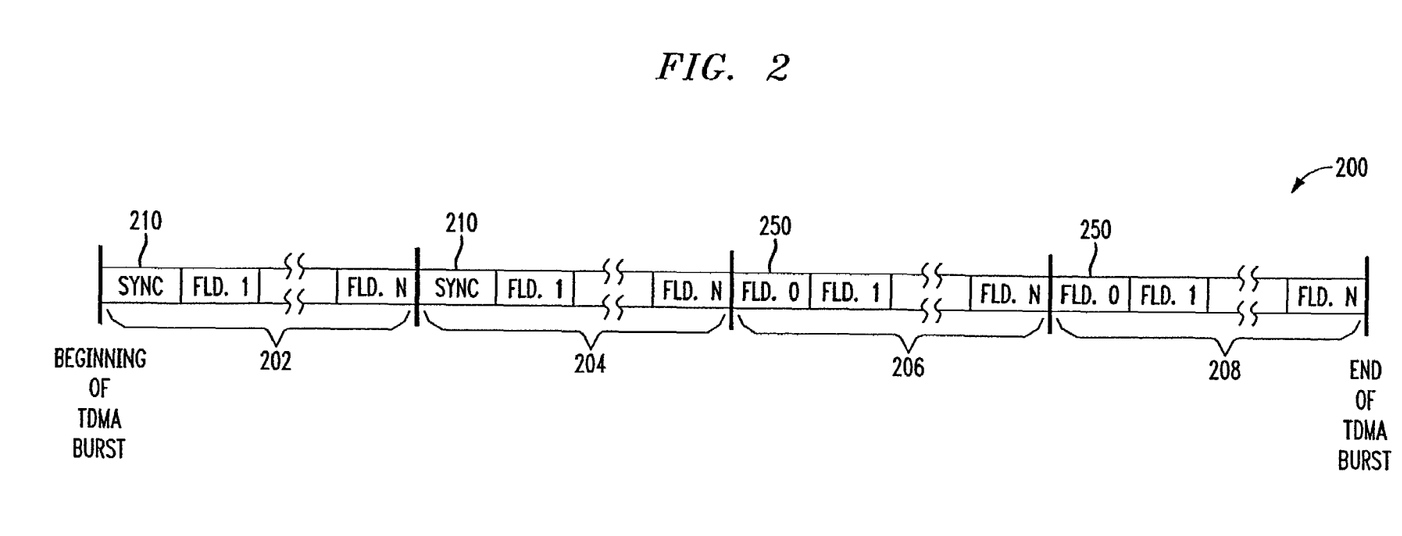
FIG. 2 shows a TDMA burst including less than all data frames including a sync word, and remaining data frames toward the end of the TDMA burst including a data payload field 0 in place of a sync word, in accordance with the principles of the present invention.

FIG. 2 shows a TDMA burst including less than all data frames including a sync word, and remaining data frames toward the end of the TDMA burst including a data payload field zero (field 0) in place of a sync word, in accordance with the principles of the present invention.

In particular, as shown in FIG. 2, a TDMA burst 200 includes a plurality of data frames 202–208. The initial one or so frames 202, 204 include a sync word 210. However, in accordance with the principles of the present invention, because the master clock 108 of the receiving TDMA device is tightly controlled and centered with respect to the received data, the sync word may be removed or replaced for the remaining frames 206, 208.

As shown in FIG. 2, the sync word which otherwise would be present in the last frames 206, 208 is replaced with a data payload field (e.g., fld. 0). In an alternative embodiment, the sync word may be eliminated, shortening the remaining data frames and thus reducing the bandwidth required to transmit the TDMA burst. In yet another alternative embodiment, the sync word may be inserted periodically into data frames, but not into all data frames, and preferably not into a majority of data frames. For example, the sync word may be inserted into every $100^{th}$ data frame.

Figure 3A:
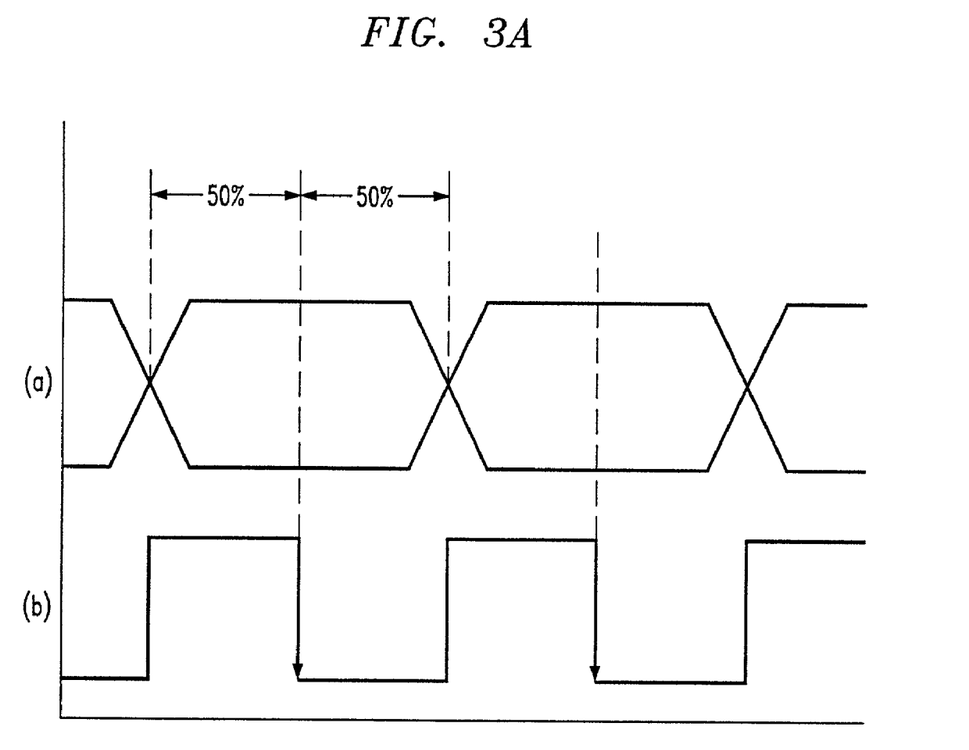
FIG. 3A shows an ideal positioning of transitions of a data clock (waveform (b)) with respect to bits or symbols of a received data stream (waveform (a)).

FIG. 3A shows an ideal positioning of transitions of a data clock (waveform (b)) with respect to bits or symbols of a received data stream (waveform (a)).

As shown in FIG. 3A, the active edge of the master clock 108 (waveform (a)) is ideally centered with respect to the received data (waveform (b)). This centering is ensured by the control loop formed by the data clock transition position determiner 150 and control of the master clock 108. This control loop insures that when the TDMA burst receiver front end 100 turns on, it will always start in the middle of a certain incoming symbol in a TDMA frame, for example during the first symbol in a preamble sequence.

A timing recovery circuit associated with the master clock 108 is then allowed to update based on symbol transitions of the incoming frame for the duration of the frame.

Figure 3B:
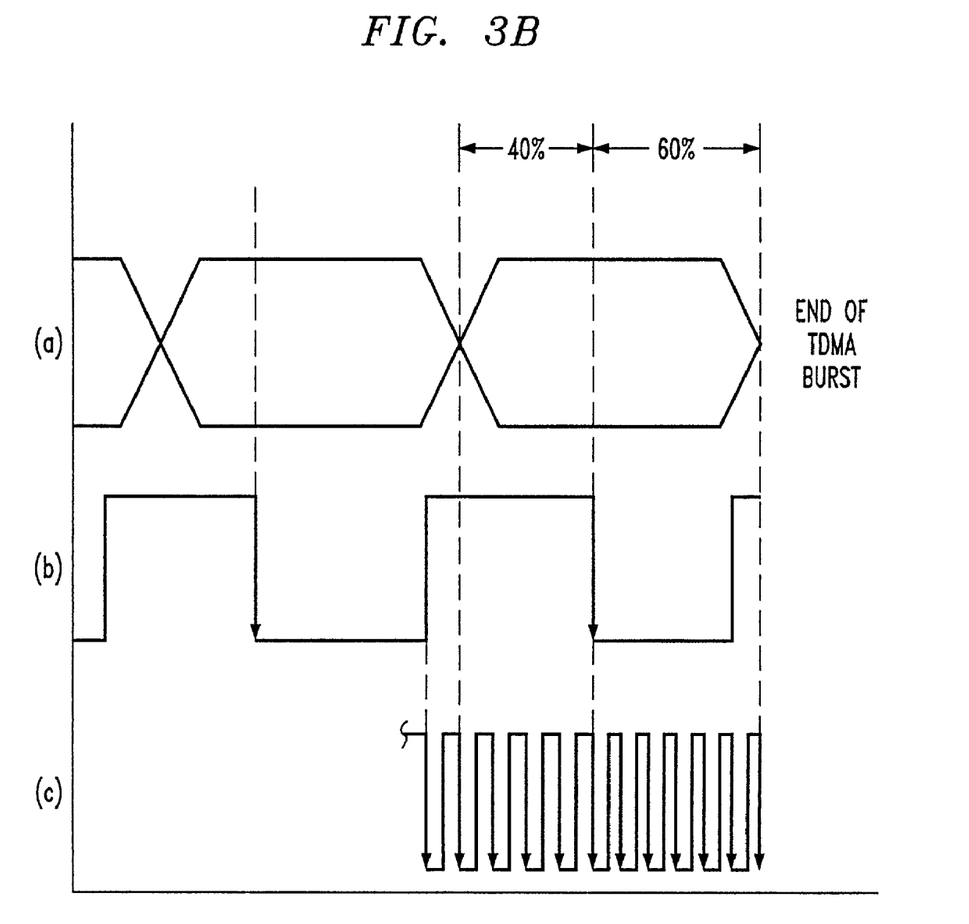
FIG. 3B shows a drifted positioning of transitions of a data clock (waveform (b)) with respect to a last bit or symbol of a received TDMA burst (waveform (a)).

FIG. 3B shows a drifted positioning of transitions of a data clock (waveform (b)) with respect to a last bit or symbol of a received TDMA burst (waveform (a)).

In particular, as shown in FIG. 3B, the positioning of the recovered clock output (waveform (b)) may inevitably tend to drift from the beginning of the TDMA burst toward the end of the TDMA burst. For instance, as shown in FIG. 3B, the active edge (e.g., negative edge) of the local master clock 108 is shown to have sped up slightly such that the active transition of the master clock 108 occurs 40% into the data bit, with 60% of the data bit remaining after the active transition of the master clock 108.

In accordance with the principles of the present invention, the shift of the master clock 108 is measured by the data clock transition position determiner 150, which utilizes an oversampled or faster clock (e.g., the master clock multiplied by ten as shown in waveform (c)).

Preferably, the jitter of the local clock and control timing in terms of receiver turn on time are controlled to within less than one symbol time so that a symbol boundary is not crossed from frame to frame. This is particularly desirable in terms of when the receiver is turned on relative to where the first incoming symbol is positioned with respect to the active edge of the master clock.

Thus, in accordance with the principles of the present invention, a control loop monitors the state of timing recovery at the end of the TDMA burst to see if the local master clock has drifted off from the center of the last symbol at the end of the burst. If so, an adjustment to the local master oscillator 108 is made to bring it back towards the center of the first symbol in the next incoming TDMA burst.

By repositioning the master clock 108, the first and last symbol of each frame may be effectively wasted since only half of the symbol time may be fed into the receiver. Typically, this is not sufficient energy integration time to make a correct symbol decision. However, since first and last symbols are normally considered not reliable, and since a sync word is usually several bits in length, a net gain remains by removing or replacing the sync word altogether.

Furthermore, this results in a more reliable communication field or a reduced bit error rate, or even a more particularly reduced frame error rate, because it decreases the probability of a false start of frame condition. Because this new scheme depends only on the accuracy of the timing recovery circuit, there is no additional probability incurred for false sync word detection as would be the case with a more traditional approach which depends not only on accurate timing recovery, but also on accurate sync word detection.

The described embodiments can be implemented in, e.g., a cordless telephone chipset using a non-coherent FSK integrate and dump receiver. The receiver oscillator or clock control loop may be implemented in, e.g., software.

The present invention provides improved performance in terms of link quality, as compared to conventional sync word detection based schemes.

The present invention eliminates the need for extra bandwidth to carry the non-payload type information associated with the conventional use of a sync word. The present invention also improves link performance.

While the embodiments of the present invention are shown with data clocking or latching performed on a negative transition of a clock, would be apparent to those of ordinary skill in the art that the principles of the present invention relate equally to embodiments utilizing data clocking or latching on positive transitions of a clock signal.

While the invention has been described with reference to the exemplary preferred embodiments thereof, those skilled in the art will be able to make various modifications to the described embodiments of the invention without departing from the true spirit and scope of the invention.

What is claimed is:

1. A system using a data format, comprising:
   a receiver to receive a transmitted plurality of time slot based data frames, wherein less than all, but more than one, of said plurality of time slot based data frames, as transmitted, including a sync word;
   a monitor to monitor clock drift caused by a lack of sync words; and
   an adjustor to adjust a clock signal if said clock drift is greater than a predetermined value;
   wherein at least two adjacent ones of said plurality of time slot based data frames, as transmitted, do not include a sync word.

2. The system using a data format according to claim 1, wherein:
   said time slot based data frames are TDMA data frames.

3. The system using a data format according to claim 1, wherein:
   said sync word is included at a beginning of said less than all of said transmitted plurality of time slot based data frames.

4. The system using a data format according to claim 1, wherein:
   said at least two adjacent ones of said plurality of time slot based data frames include data payload in a position containing said sync word in said less than all of said transmitted plurality of time slot based data frames.

5. Apparatus for receiving a time slot based data burst, comprising:

a receiver to receive a time slot based burst containing a plurality of frames, less than all, but more than one, of said frames including a sync word;

a master clock;

a data clock transition position determiner to determine a position of an active edge of said master clock with respect to received data;

wherein said data clock transition position determiner adjusts a frequency of said master clock to maintain a centering of said active edge of said master clock within a respective portion of said received data.

6. The apparatus for receiving a time slot based data burst according to claim 5, wherein:

said time slot based burst is a TDMA burst.

7. A method of receiving time slot based burst data, comprising:

receiving a time slot based burst containing a plurality of frames;

decoding a sync word in less than all frames of said time slot based burst; and controlling a centering of an active edge of a master clock with respect to at least one symbol in at least one of said plurality of frames.

8. The method of receiving time slot based burst data according to claim 7, wherein:

said at least one symbol is in a last one of said plurality of frames in said time slot based burst.

9. The method of receiving time slot based burst data according to claim 7, wherein:

said at least one symbol is a last symbol in a last one of said plurality of frames in said time slot based burst.

10. Apparatus for receiving time slot based burst data, comprising:

means for receiving a time slot based burst containing plurality of frames;

means for decoding a sync word in less than all frames of said time slot based burst; and means for controlling a centering of an active edge of a master clock with respect to at least one symbol in at least one of said plurality of frames.

11. The apparatus for receiving time slot based burst data according to claim 10, wherein:

said at least one symbol is in a last one of said plurality of frames in said time slot based burst.

12. The apparatus for receiving time slot based burst data according to claim 10, wherein:

said at least one symbol is a last symbol in a last one of said plurality of frames in said time slot based burst.

13. The method of receiving time slot based burst data according to claim 7, wherein:

said sync word is in less than all, but more than one, frames of said time slot based burst.

14. The apparatus for receiving time slot based burst data according to claim 10, wherein:

said sync word is in less than all, but more than one, frames of said time slot based burst.

* * * * *